US011634343B2

(12) United States Patent
Sugiyama

(10) Patent No.: US 11,634,343 B2
(45) Date of Patent: *Apr. 25, 2023

(54) WASTE LIQUID TREATING DEVICE AND SWARF POWDER RECOVERY DEVICE

(71) Applicant: DISCO CORPORATION, Tokyo (JP)

(72) Inventor: Satoshi Sugiyama, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 167 days.

This patent is subject to a terminal disclaimer.

(21) Appl. No.: 17/191,938

(22) Filed: Mar. 4, 2021

(65) Prior Publication Data
US 2021/0292197 A1    Sep. 23, 2021

(30) Foreign Application Priority Data
Mar. 17, 2020    (JP) .............................. JP2020-046296

(51) Int. Cl.
*B03C 5/02* (2006.01)
*C02F 1/04* (2023.01)
*C02F 1/48* (2023.01)

(52) U.S. Cl.
CPC .................. *C02F 1/48* (2013.01); *B03C 5/02* (2013.01); *C02F 1/043* (2013.01)

(58) Field of Classification Search
CPC ... B03C 5/02; B08B 5/02; C02F 1/043; C02F 2103/346
See application file for complete search history.

(56) References Cited

FOREIGN PATENT DOCUMENTS

| CN | 206322713 U | * | 7/2017 |
| CN | 206731638 U | * | 12/2017 |
| JP | 2012218134 A | | 11/2012 |
| JP | 2014124576 A | | 7/2014 |
| JP | 2016049506 A | | 4/2016 |

OTHER PUBLICATIONS

Gauden, C. G. "Air Knives for Finishing." IEE Colloquium on Surface Coating and Finishes. IET, 1991. (Year: 1991).*
Fujita Atsushi et al—JP 2016-49506 A machine translation—2016 (Year: 2016).*
Han L—CN-206322713-U machine translation—Jul. 2017 (Year: 2017).*
Luo X—CN-206731638-U machine translation—Dec. 2017 (Year: 2017).*

* cited by examiner

*Primary Examiner* — Bradley R Spies
(74) *Attorney, Agent, or Firm* — Greer Burns & Crain Ltd.

(57) ABSTRACT

A waste liquid treating device includes a holding section that holds an adhesion plate, a vertically moving mechanism that moves the holding section vertically, and a peeling mechanism that peels off water-containing swarf from the adhesion plate held by the holding section. The peeling mechanism includes two air nozzles extending in parallel to each other in a horizontal direction with a spacing therebetween and including jet ports formed to face each other, a valve disposed in a piping providing communication between the two air nozzles and an air source, and a control unit that performs control of opening and closing of the valve and control of the vertically moving mechanism for moving the adhesion plate in the vertical direction in the spacing between the two air nozzles.

4 Claims, 3 Drawing Sheets

WASTE LIQUID TREATING DEVICE AND SWARF POWDER RECOVERY DEVICE

BACKGROUND OF THE INVENTION

Field of the Invention

The present invention relates to a waste liquid treating device for removing swarf from a waste liquid and a swarf powder recovery device for recovering swarf powder obtained by drying the swarf removed.

Description of the Related Art

In grinding of grinding a workpiece by a grindstone while supplying grinding water to a processing point, a grinding waste liquid containing swarf generated by grinding in the grinding water is reserved in a water tank of a waste liquid treating device as disclosed in Japanese Patent Laid-open No. 2014-124576, the swarf in the grinding waste liquid is adhered to an adhesion plate in the water tank, and the adhesion plate is taken out of the grinding waste liquid in the water tank, whereby the swarf is removed from the grinding waste liquid. The grinding waste liquid from which the swarf has been removed is regenerated, for example, by a processing liquid regenerating device as disclosed in Japanese Patent Laid-open No. 2012-218134, and is reused in the grinding device.

The waste liquid treating device as disclosed in Japanese Patent Laid-open No. 2014-124576 has cathode plates and anode plates alternately disposed in a water tank, and, for example, when the workpiece is silicon, silicon swarf in the grinding waste liquid is adhered to the anode plates as adhesion plates. The anode plates with the silicon swarf adhered thereto is drawn out of the water tank, then, for example, the silicon swarf adhered to the anode plates is peeled off with a rubber spatula as disclosed in Japanese Patent Laid-open No. 2016-049506, and thereafter the anode plates are immersed in the water tank.

SUMMARY OF THE INVENTION

At the time of peeling off the silicon swarf from the anode plates, the silicon swarf adheres to and dries on the rubber spatula which is pressed against the anode plates. With the silicon swarf adhered to the rubber spatula drying and solidifying, the rubber spatula loses elasticity and becomes a hard plate. Therefore, the silicon swarf adhering to the anode plates is peeled off with a hard plate, whereby the anode plates may be damaged.

In addition, the silicon swarf peeled off from the anode plates is recovered after dried, whereby the silicon swarf can be used as a material for a minus electrode or the like, for example. Therefore, the water-containing silicon swarf peeled off from the anode plates is charged into a silicon recovery device, and is dried in the drying chamber of the silicon recovery device by drying by heating by use of a heater or the like, for example, or is dried by air charged into the drying chamber, to obtain silicon powder. However, there are problems such as large power consumption or air consumption of the silicon recovery device.

Accordingly, it is an object of the present invention to provide a waste liquid treating device that does not damage anode plates when removing swarf such as silicon swarf from the anode plates (adhesion plates). In addition, it is another object of the present invention to provide a swarf powder recovery device for recovering swarf such as silicon swarf and drying the swarf to obtain swarf powder (for example, silicon powder), which can efficiently dry the swarf while reducing power consumption and air consumption.

In accordance with an aspect of the present invention, there is provided a waste liquid treating device in which a waste liquid that contains swarf, the waste liquid being discharged when a workpiece is ground by use of a processing liquid and abrasive grains, is stored in a water tank, an adhesion plate is immersed in the waste liquid stored in the water tank, and the adhesion plate with the swarf adhered thereto is taken out of the water tank to thereby remove the swarf from the waste liquid. The waste liquid treating device includes a holding section that holds the adhesion plate, a vertically moving mechanism that moves the holding section vertically, and a peeling mechanism that peels the water-containing swarf from the adhesion plate held by the holding section. The peeling mechanism includes two air nozzles extending in parallel to each other in a horizontal direction with a spacing therebetween and having jet ports formed to face each other, a valve disposed in a piping providing communication between the two air nozzles and an air source, and a control unit that performs control of opening and closing of the valve and control of the vertically moving mechanism that moves the adhesion plate in a vertical direction in the spacing between the two air nozzles. The valve is opened when the adhesion plate is raised after the adhesion plate held by the holding section is made to enter the spacing between the parallel two air nozzles, and the swarf adhered to the adhesion plate is peeled off on a non-contact basis by air pressure of air jetted from the jet ports to one surface and another surface of the adhesion plate.

In accordance with another aspect of the present invention, there is provided a swarf powder recovery device that recovers swarf powder obtained by drying the water-containing swarf peeled off from the adhesion plate of the waste liquid treating device in which a waste liquid that contains swarf, the waste liquid being discharged when a workpiece is ground by use of a processing liquid and abrasive grains, is stored in a water tank, an adhesion plate is immersed in the waste liquid stored in the water tank, and the adhesion plate with the swarf adhered thereto is taken out of the water tank to thereby remove the swarf from the waste liquid. The waste liquid treating device includes a holding section that holds the adhesion plate, a vertically moving mechanism that moves the holding section vertically, and a peeling mechanism that peels the water-containing swarf from the adhesion plate held by the holding section. The peeling mechanism includes two air nozzles extending in parallel to each other in a horizontal direction with a spacing therebetween and having jet ports formed to face each other, a valve disposed in a piping providing communication between the two air nozzles and an air source, and a control unit that performs control of opening and closing of the valve and control of the vertically moving mechanism that moves the adhesion plate in a vertical direction in the spacing between the two air nozzles. The valve being opened when the adhesion plate is raised after the adhesion plate held by the holding section is made to enter the spacing between the parallel two air nozzles, and the swarf adhered to the adhesion plate being peeled off on a non-contact basis by air pressure of air jetted from the jet ports to one surface and another surface of the adhesion plate. The swarf powder recovery device includes a drying mechanism that dries the swarf peeled off from the adhesion plate by the peeling mechanism. The drying mechanism includes a conveying belt on which the swarf peeled off by the peeling mechanism is mounted and which moves the swarf in a horizontal direction, a recovery box that recovers the swarf powder conveyed by the conveying belt, and a drying chamber covering an upper portion of the conveying belt and extending in an extending direction of the conveying belt. The drying chamber includes a charging port which is disposed on one end side of the conveying belt and through which to charge the swarf, and an exhaust port disposed on another end side of the conveying belt for exhausting air jetted from the air nozzles of the peeling mechanism and charged into the drying chamber together with the swarf through the charging port. Air jetted by the air nozzles flows in the drying chamber in a direction from the charging port toward the exhaust port, to thereby dry the swarf mounted on the conveying belt and containing water, thereby recovering the swarf powder.

In the waste liquid treating device according to an aspect of the present invention, the valve is opened when the adhesion plate is raised after the adhesion plate held by the holding section is made to enter the spacing between the parallel two air nozzles, and the swarf adhered to the adhesion plate can be peeled off on a non-contact basis by the air pressure of air jetted from the jet port to one surface and another surface of the adhesion plate. Therefore, the adhesion plate would not be damaged.

In addition, in the swarf powder recovery device according to another aspect of the present invention, air jetted by the air nozzles of the waste liquid treating device flows in the direction from the charging port toward the exhaust port in the drying chamber, whereby the water-containing swarf mounted on the conveying belt can be dried, and the dried swarf powder can be recovered. Besides, the air used in peeling off the swarf from the adhesion plate can be charged into the drying chamber as it is to be utilized as air for drying the swarf, whereby drying of the swarf is accelerated, and it is unnecessary to charge separate air into the drying chamber for drying. Therefore, air consumption can be suppressed, and power consumption of the swarf powder recovery device can be suppressed as compared to heater drying.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
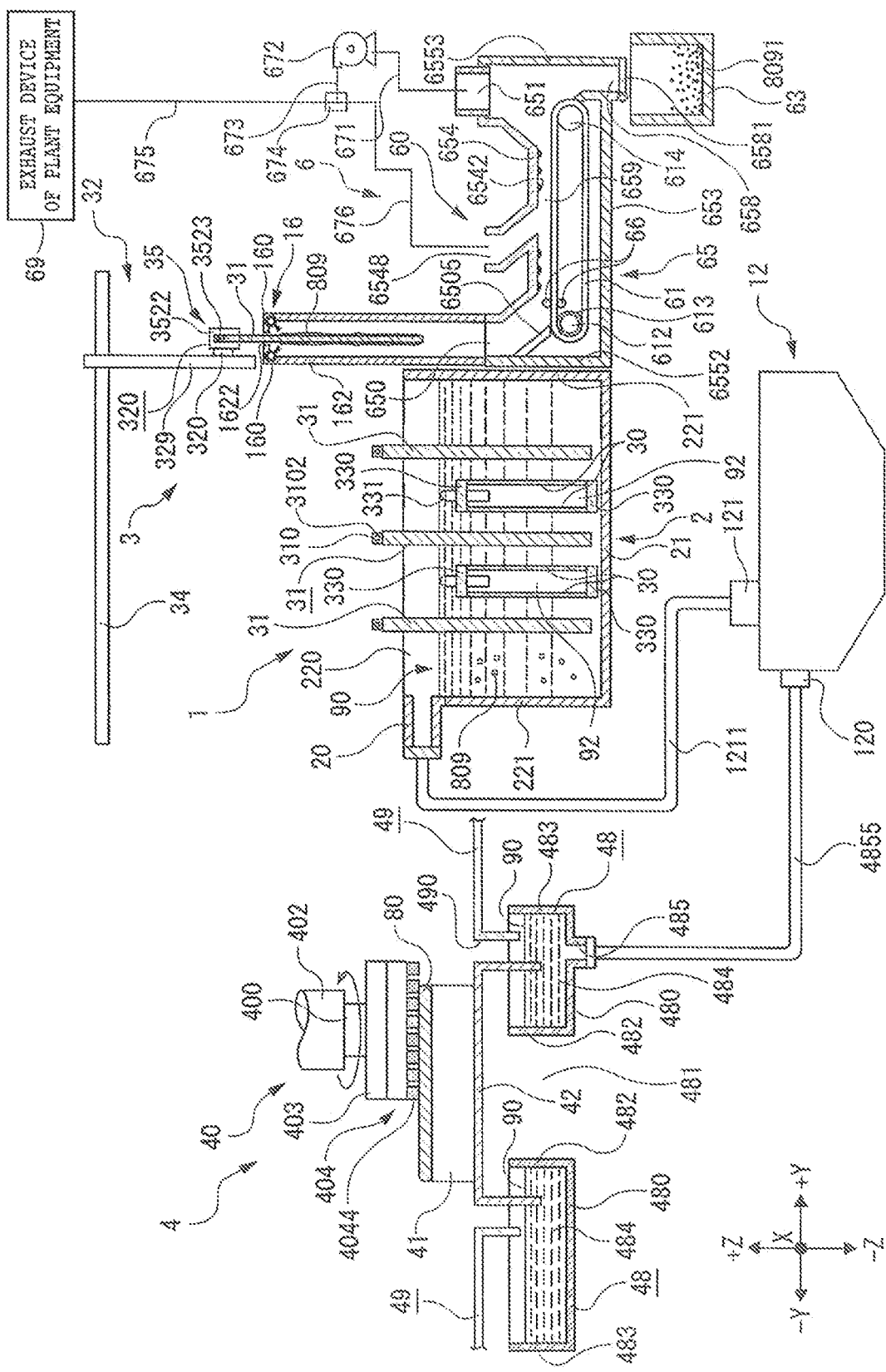
FIG. 1 is a sectional view depicting an example of the structures of a swarf generating device (grinding device), a waste liquid treating device, and a swarf powder recovery device.

An embodiment of the present invention will be described below referring to the drawings. A waste liquid treating device 1 illustrated in FIG. 1 is a device that removes swarf 809 with high water content from a waste liquid 90 containing the swarf 809 of a solid workpiece 80 discharged after ground by grindstones 4044 while a processing liquid (for example, pure water) is supplied in a grinding device 4 which is an example of a swarf generating device. The waste liquid treating device 1 may be incorporated in the grinding device 4, or may be a separate body from the grinding device 4.

Note that the waste liquid treating device 1 may be a device for removing swarf from a waste liquid containing the swarf generated by a cutting device that cuts a silicon wafer or the like by a rotating cutting blade.

The grinding device 4 depicted in FIG. 1 includes at least a holding table 41 that holds the workpiece 80, and a grinding unit 40 that grinds the workpiece 80 by the rotating grindstones 4044.

In the present embodiment, the solid workpiece 80 is a silicon wafer, but the workpiece may be a cylindrical silicon ingot.

The holding table 41 disposed on a base 49 of the grinding device 4 has a holding surface (upper surface) that includes, for example, a porous member or the like and communicates with a suction source (not illustrated). The holding table 41 is rotatable around a rotary shaft whose rotational axis is in a Z axis direction, and is supported by a table support base 42. The table support base 42 disposed in an opening 490 formed in an upper surface of the base 49 is reciprocally movable in an X axis direction (in the direction perpendicular to the sheet plane of FIG. 1) by an X axis moving mechanism (not illustrated) such as an electric actuator.

At both sides of a moving route of the holding table 41, box-shaped water cases 48 are disposed. The water cases 48 are depicted in the state of being separated at two left and right positions of the table support base 42, but they are similarly formed also in the direction perpendicular to the sheet plane of FIG. 1. The water case 48 is formed in a box shape rectangular in plan view, and has an integral tub section 484. In other words, for reciprocally moving the holding table 41 in the X-axis direction, the water case 48 is formed with a rectangular opening 481 in a central portion of a bottom plate 480 of the box-shaped member. The water case 48 includes the tub section 484 including the bottom plate 480, an inside wall 482 and an outside wall 483, and a drain port 485 formed to penetrate the bottom plate 480. One end of a liquid supply pipe 4855 extending in the outside of the water case 48 is connected to the drain port 485. The water case 48 receives the waste liquid 90 that contains the swarf 809 ground from the workpiece 80 and discharged and flows down from the holding table 41, and sends the waste liquid 90 to a tank 12.

The grinding unit 40 rotationally drives, by a motor 402, a rotary shaft 400 whose axial direction is in a Z-axis direction (vertical direction) orthogonal to the holding surface of the holding table 41, and grinds the workpiece 80 by a grinding wheel 404 detachably connected to a lower end of the rotary shaft 400 through a mount 403. The grinding wheel 404 includes an annular wheel base, and a plurality of grindstones 40 having a substantially rectangular parallelepiped external shape and arranged in an annular pattern on a lower surface of the wheel base.

The grinding unit 40 is vertically movable in the Z-axis direction.

For example, the rotary shaft 400 is provided therein with a flow channel (not illustrated) communicating with a processing liquid supply source and serving as a passage of the processing liquid, in the form of penetrating the rotary shaft 400 in the axial direction (Z-axis direction), and the flow channel opens in the bottom surface of the wheel base such as to be able to jet the processing liquid toward the grindstones 4044. Note that a processing liquid nozzle may be disposed at a position adjacent to the grinding wheel 404 of the grinding unit 40 in the state of being lowered to a position for grinding the workpiece 80, and the processing liquid may be jetted, and directly supplied, from the processing liquid nozzle to a contact part of the grindstones 4044 and the workpiece 80.

The waste liquid treating device 1 depicted in FIG. 1 includes at least a water tank 2 for storing the waste liquid 90, a take-out unit 3 for taking out the swarf 809 with high water content from the water tank 2, and a peeling mechanism 16 for peeling off the swarf 809 with high water content from an adhesion plate 31 (anode plate 31) held by a holding section 35 of the take-out unit 3.

For example, the tank 12 for accommodating the waste liquid 90 is disposed at a position below the drain port 485 of the water case 48, and the tank 12 includes a supply port 120 to which the other end of a liquid supply pipe 4855 is connected. The tank 12 includes a feed-out pump 121 for scooping the waste liquid 90 containing the swarf 809 of the workpiece 80 from the tank 12 and feeding out the waste liquid 90 to the water tank 2, and the feed-out pump 121 feeds out the waste liquid 90 toward an inflow port 20 of the water tank 2 through a feed-out pipe 1211.

Figure 2:
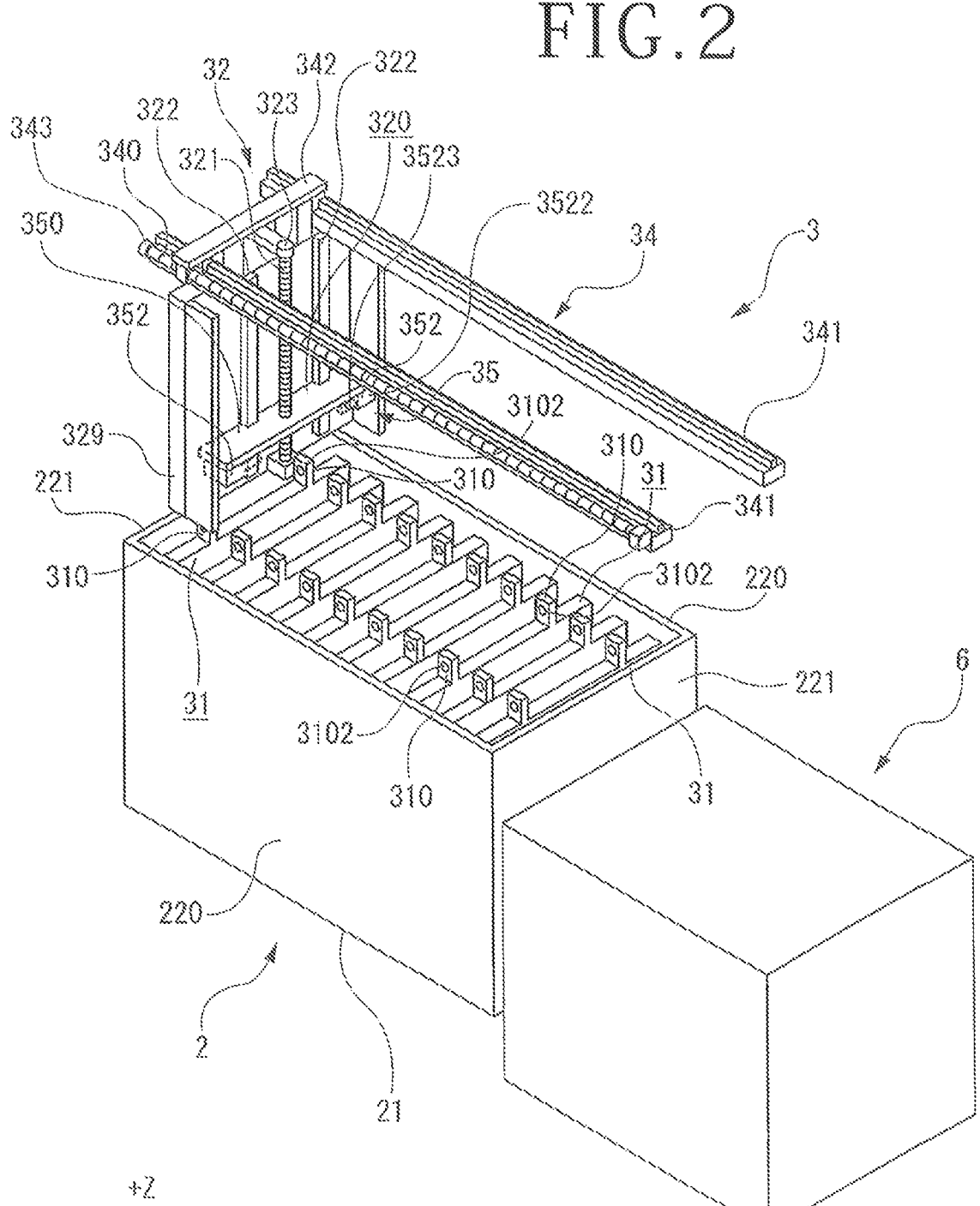
FIG. 2 is a perspective view depicting an example of a water tank accommodating an anode plate, which is an adhesion plate, and a cathode plate, a holding section that holds the adhesion plate, and a vertically moving mechanism that moves the holding section vertically.
Figure 2:
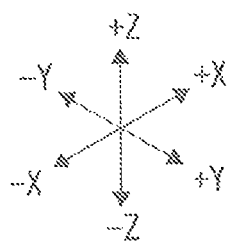

The substantially rectangular parallelepiped box-shaped water tank 2 is formed, for example, from an insulating material such as a synthetic resin, includes a bottom plate 21 rectangular in plan view, and four side walls rising in the +Z direction integrally from the outer periphery of the bottom plate 21, and can reserve the waste liquid 90 containing the swarf 809 of the workpiece 80 in the space surrounded by the bottom plate 21 and the side walls. In FIGS. 1 and 2, the two side walls facing each other in the X-axis direction are referred to side walls 220, whereas the two side walls facing each other in the Y-axis direction are referred to as side walls 221.

In addition, at an upper portion of the water tank 2, an overflow pipe (not illustrated) for preventing the waste liquid 90 from spilling over is provided. The overflow pipe communicates with the tank 12, and guides the waste liquid 90 going to spill over from the water tank 2 again to the tank 12.

The take-out unit 3 depicted in FIGS. 1 and 2 for taking out the swarf 809 containing water from the waste liquid 90 in the water tank 2 includes, for example, a cathode plate 30 (not illustrated in FIG. 2) disposed in the water tank 2 for the purpose of electrifying in minus polarity, the adhesion plate 31 as an anode plate which faces the cathode plate 30, can be inserted into and removed from the water tank 2, is electrified in plus polarity, and adsorb the swarf 809 containing water, the holding section 35 for holding the adhesion plate 31, and a vertically moving mechanism 32 for vertically moving the holding section 35.

The adhesion plate 31 is configured by use of a material which is electrochemically noble, and is formed to be rectangular in plan view shape. For example, the adhesion plate 31 may be configured by a material such as copper, silver, platinum or gold, and, in the present embodiment, SUS is applied. The swarf 809 mainly adheres to a surface on one side which is a side surface in the Y-axis direction of the adhesion plate 31, and a surface on the other side which is a side surface opposite to the surface on the one side.

For example, inside surfaces of the two side walls 220 facing each other in the X-axis direction of the water tank 2 depicted in FIGS. 1 and 2 are formed with a plurality of support grooves (not illustrated), and the adhesion plates 31 are disposed in the water tank 2 in the state of being inserted in the support grooves at predetermined spacings in the X-axis direction. In other words, the plurality of adhesion plates 31 are disposed with spacings therebetween in a state in which both side surfaces thereof are orthogonal to the longitudinal direction (Y-axis direction) of the water tank 2 and parallel to the width direction (X-axis direction) of the water tank 2. At an upper surface of the adhesion plate 31, two engaged sections 310 projecting upward with a spacing therebetween from a central part in the width direction (X-axis direction) are provided. The engaged section 310 are formed in a rectangular plate-like shape, and is provided in the center with an engaged hole 3102 penetrating in the X-axis direction. Into the engaged hole 3102, an engaging pin 3523 of the holding section 35 depicted in FIGS. 1 and 2 enters and is engaged.

The cathode plate 30 depicted in FIG. 1 is provided between the mutually adjacent adhesion plates 31. In other words, a plurality of cathode plates 30 are disposed and alternately with the adhesion plates 31 in a spaced state, facing the adhesion plates 31 in the Y-axis direction, and are in a state of being parallel to the adhesion plates 31.

The cathode plate 30 is, for example, as depicted in FIG. 1, supported by a housing 330 rectangular and annular in side view, and the housing 330 is formed with a discharge section 331. The discharge section 331 is, for example, a piping for feeding clean water 92 deprived of the swarf 809 and flowing into the housing 330 to a clean water reserving tank. The cathode plates 30 are disposed in parallel and with a spacing therebetween such as to close both side openings of the housing 330.

The cathode plates 30 are configured by use of a material which is electrochemically noble, like the adhesion plates 31, and are formed in a rectangular flat plate shape in plan view shape. For example, the cathode plates 30 may be configured by use of a material such as copper, silver, platinum or gold. In the present embodiment, SUS is applied. The cathode plate 30 is, for example, formed in a plate-like shape having meshes, and, for preventing the swarf 809 from being caught by the meshes, the cathode plate 30 is electrified in minus polarity to generate repelling force to the swarf 809. In other words, by being electrified in minus polarity, the cathode plate 30 permits only the clean water 92 as a liquid in the waste liquid 90 to pass therethrough, whereas generates a repelling force between itself and the minus electrified swarf 809, thereby restricting the passage of the swarf 809 therethrough. As a result, the housing 330 and the cathode plate 30 form a region where the clean water 92 having passed through the cathode plate 30 in the inside thereof, and, since the cathode plate 30 generates the repelling force between itself and the swarf 809, the region where the clean water 92 is present is partitioned from the waste liquid 90 in the water tank 2.

Note that the shape of the cathode plate 30 and the like are not limited to those in the present embodiment.

Gaps of a predetermined width are provided between the lower ends of each cathode plate 30 and each adhesion plate 31 and the bottom plate 21 of the water tank 2, and the waste liquid 90 flowing into the water tank 2 rises between the cathode plate 30 and the adhesion plate 31 by passing through the gaps.

In the present embodiment, a direct current (DC) voltage is impressed between the adhesion plate 31 and the cathode plate 30. In other words, the plus (+) side of a DC power source (not illustrated) is connected to the adhesion plate 31 to electrify the adhesion plate 31 in plus polarity in the waste liquid 90, thereby adsorbing the swarf 809 which is silicon swarf electrified in minus polarity in the waste liquid 90. On the other hand, the minus (−) side of the DC power source (not illustrated) is connected to the cathode plate 30, to electrify the cathode plate 30 in minus polarity in the waste liquid 90. As a result, an electric field is formed between the adhesion plate 31 and the cathode plate 30. Then, the swarf 809 mixed in the waste liquid 90 and electrified in minus (−) polarity is repelled from the cathode plate 30 electrified in minus (−) polarity by electrophoresis, and is adsorbed on the adhesion plate 31 which is electrified in plus (+) polarity.

The vertically moving mechanism 32 that vertically moves the holding section 35 holding upper portions of the adhesion plates 31 depicted in FIGS. 1 and 2 to drawn out the adhesion plates 31 from the water tank 2 or to insert the adhesion plates 31 into the water tank 2 is reciprocally movable horizontally in the Y-axis direction on the upper side of the water tank 2 by a Y-axis direction moving mechanism 34. The Y-axis direction moving mechanism 34 depicted in detail in FIG. 2 includes a horizontal ball screw 340 provided in parallel to the longitudinal direction (Y-axis direction) of the water tank 2, a motor 343 that rotationally drives the horizontal ball screw 340, a pair of guide rails 341 for horizontal movement which extend in the Y-axis direction, and a movable member 342 of which a nut in the inside thereof makes screw engagement with the horizontal ball screw 340 and lower surfaces of both ends of which makes sliding contact with the guide rails 341. With the horizontal ball screw 340 rotated by driving by the motor 343, the vertically moving mechanism 32 fixed on the movable member 342 is moved in the Y-axis direction while being guided by the guide rails 341. The horizontal ball screw 340 and the guide rails 341 have a length ranging from the upper side of the water tank 2 to the upper side of the swarf powder recovery device 6, and, by moving the vertically moving mechanism 32 and the holding section 35 in the Y-axis direction, the adhesion plates 31 held by the holding section 35 can be moved from the water tank 2 to the upper side of the swarf powder recovery device 6.

Note that, in FIG. 2, the swarf powder recovery device 6 is depicted in a simplified form.

The vertically moving mechanism 32 depicted in detail in FIG. 2 includes a vertical plate 329 having an upper end fixed to the movable member 342, a vertical ball screw 321 provided at a side surface of the vertical plate 329 in parallel to the depth direction (Z-axis direction) of the water tank 2, a motor 323 that rotationally drives the vertical ball screw 321, and a pair of guide rails 322 extending in the Z-axis direction. The holding section 35 has a nut in the inside thereof in screw engagement with the vertical ball screw 321, and has side surfaces in sliding contact with the guide rails 322. With the vertical ball screw 321 rotated by driving by the motor 323, the holding section 35 is moved in the Z-axis direction while being guided by the guide rails 322.

The holding section 35 that holds the adhesion plates 31 includes for example, a plate-shaped member 350 which has a nut in the inside thereof in screw engagement with the vertical ball screw 321 and extends in the width direction of the adhesion plates 31, and a pair of chuck cylinders 352 disposed at a lower surface of the plate-shaped member 350. The pair of chuck cylinders 352 are disposed with a spacing therebetween in the width direction (X-axis direction) of the water tank 2. The pair of chuck cylinders 352 include a cylinder main body 3522 attached to the plate-shaped member 350, and an engaging pin 3523 provided to be projectable and retractable relative to the cylinder main body 3522 in the width direction (X-axis direction) of the water tank 2. For example, the engaging pins 3523 of the pair of chuck cylinders 352 project from the cylinder main bodies 3522 such as to approach each other in the X-axis direction. When the engaging pins 3523 project from the cylinder main bodies 3522 such as to approach each other in a state in which the holding section 35 is lowered to be located on the upper side of the adhesion plates 31, the engaging pins 3523 are inserted respectively into the engaged holes 3102 of the engaged sections 310 of the adhesion plates 31. As a result, a state in which the holding section 35 holds the adhesion plates 31 is realized.

Figure 3:
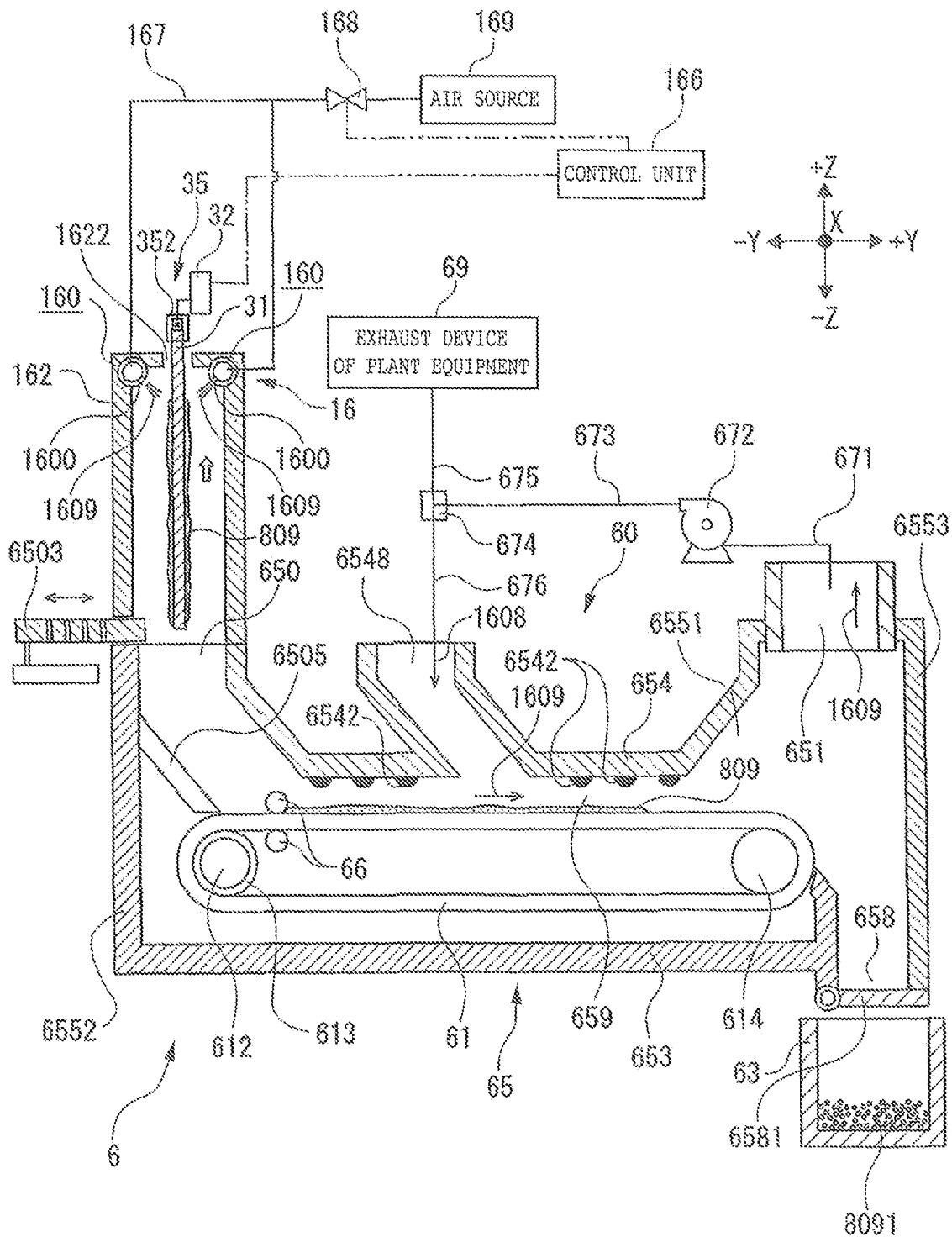
FIG. 3 is a sectional view depicting the manner in which water-containing swarf is peeled off from the adhesion plate taken out of the water tank by the holding section and is charged into a drying chamber of the swarf powder recovery device by jetting air from air nozzles, and the air jetted by the air nozzles flows in the drying chamber in a direction from a charging port toward an exhaust port, whereby swarf mounted on a carrying belt and containing water is dried and the swarf powder is recovered.

The peeling mechanism 16 depicted in detail in FIG. 3 that peels off the swarf 809 containing water from the adhesion plates 31 held by the holding section 35 includes two air nozzles 160 having a plurality of jet ports 1600 and formed to extend with a spacing therebetween in parallel to a horizontal direction (X-axis direction) and to face each other, a valve 168 disposed in a piping 167 that provides communication between the two air nozzles 160 and an air source 169, and a control unit 166 that performs control of opening and closing of the valve 168 and control of the vertically moving mechanism 32 for moving the adhesion plates 31 held by the holding section 35 in the vertical direction in the spacing between the two air nozzles 160.

The air nozzles 160 depicted in FIG. 3 are fixed, for example, to side surfaces of a ceilinged box-shaped casing 162 integrally connected to a charging port 650 of a drying chamber 65 of the swarf powder recovery device 6 which will be described later. The ceiling of the casing 162 is formed with an entrance port 1622 penetrating such as to permit the adhesion plates 31 to enter the casing 162. The inside space of the casing 162 communicates with the charging port 650 of the drying chamber 65.

For example, the two air nozzles 160 fixed in a region on the upper side of the inside surfaces of the casing 162 include, for example, the plurality of jet ports 1600 aligned in the longitudinal direction (X-axis direction) and capable of jetting air 1609 toward an oblique lower inner side. Note that the jet ports 1600 are set in shape, size, and jet angle and the like such as to permit optimization of peeling-off of the swarf 809 from the adhesion plates 31 by jetted air 1609. For example, the jet ports 1600 may be formed in a single slit shape narrow in width and extending continuously along a side surface of the air nozzle 160. In other words, air jetted toward an oblique lower inner side from the jet ports 1600 of the air nozzles 160 functioning as an air knife forms an air curtain extending in the X-axis direction.

The spacing between the two air nozzles 160 facing in the Y-axis direction is such a size that the adhesion plates 31 can be moved vertically without contacting the air nozzles 160.

One end side of the piping 167 communicating on the other end side with the two air nozzles 160 through a joint or the like is connected to the air source 169 including a compressor or the like. For example, a valve 168 such as a solenoid valve that controls the state of communication between the piping 167 and the air source 169 by passing of a current is disposed in the piping 167.

The control unit 166 includes, for example, a central processing unit (CPU) that performs arithmetic processing according to a control program, and a storage element such as a memory, and is electrically connected to at least the vertically moving mechanism 32 and the valve 168. For example, the control unit 166 controls the opening and closing of the valve 168 by controlling the passage of a current to the valve 168. The control unit 166 functions, for example, as a servo amplifier, supplies an operation signal to the motor 323 of the vertically moving mechanism 32, and controls a vertical moving operation of the holding section 35 by the vertically moving mechanism 32 and a positioning operation for positioning to a predetermined height.

For example, at a position adjacent to the water tank 2 in the Y-axis direction as depicted in FIGS. 1 and 2, the swarf powder recovery device 6 that recovers the swarf powder 8091 (see FIG. 3) obtained by drying the swarf 809 containing water which is peeled off from the adhesion plates 31 by the peeling mechanism 16 of the waste liquid treating device 1 is disposed.

The swarf powder recovery device 6 includes, for example, a drying mechanism 60 that dries the swarf 809 peeled off from the adhesion plates 31 by the peeling mechanism 16. The drying mechanism 60 includes a conveying belt 61 on which to mount the swarf 809 peeled off by the peeling mechanism 16 and which moves the swarf 809 in a horizontal direction (Y-axis direction), a recovery box 63 for recovering swarf powder 8091 conveyed by the conveying belt 61, and a drying chamber 65 covering an upper portion of the conveying belt 61 and extending in the extending direction (Y-axis direction) of the conveying belt 61.

The drying chamber 65 includes the charging port 650 disposed on one end side (-Y direction side) of the conveying belt 61 for charging the swarf 809, and an exhaust port 651 disposed on the other end side (+Y direction side) of the conveying belt 61 for exhausting air which is jetted from the two air nozzles 160 of the peeling mechanism 16 and charged into the drying chamber 65 together with the swarf 809.

The drying chamber 65 has, for example, a substantially rectangular parallelepiped external shape in plan view, and includes a rectangular bottom plate 653, four side walls rising in the +Z direction integrally from the outer periphery of the bottom plate 653, and a top plate 654 connected to upper ends of the side walls and facing the upper surface of the conveying belt 61. In FIG. 3, the two side walls (only the one wall on the back side of the sheet plane of FIG. 1 is depicted) facing to each other in the X-axis direction are referred to as side walls 6551, and the two side walls facing in the Y-axis direction are referred to as a side wall 6552 and a side wall 6553. The upper side of the conveying belt 61 inside the drying chamber 65 is an air duct 659 for flowing of air in the conveying direction of the swarf 809.

On one end side (-Y direction side) of the top plate 654, the charging port 650 for charging the swarf 809 onto the conveying belt 61 is formed to penetrate in the thickness direction. In addition, the casing 162 with the air nozzles 160 attached thereto is integrally connected to the charging port 650.

For example, as in the present embodiment, a slide door 6503 capable of opening and closing the charging port 650 and slidable in the Y-axis direction may be disposed on the upper side of the charging port 650 depicted in FIG. 3. In addition, for example, on the lower side of the charging port 650, a guide plate 6505 inclined relative to the conveying belt 61 such as to guide the swarf 809 containing water, which is peeled off and dropped, onto the conveying belt 61 is disposed.

In the present embodiment, the charging port 650 plays the role of an intake port for taking air into one end side (-Y direction side) of the drying chamber 65.

For example, a lower surface of the top plate 654 may be formed with a plurality of projected portions 6542. The projected portions 6542 have, for example, a hemispherical external shape as depicted in FIG. 3, but this is not limitative, and the projected portions 6542 may have a cylindrical or prismatic external shape. For example, the plurality of projected portions 6542 are disposed at predetermined regular intervals in the X-axis direction and the Y-axis direction on the lower surface of the top plate 654, but the plurality of projected portions 6542 may be disposed at random on the lower surface of the top plate 654. In addition, in a case where the projected portions 6542 have a cylindrical or prismatic external shape, the projected portions 6542 may extend in the X-axis direction and the plurality of projected portions 6542 may be disposed at predetermined regular intervals in the Y-axis direction.

Air flowing in the conveying direction in the air duct 659 in the drying chamber 65 becomes turbulence by colliding against the projected portions 6542 on the lower surface of the top plate 654. In other words, irregular air vortexes are generated on the conveying belt 61, and air flows in the conveying direction. As a result, the turbulence is jetted against the swarf 809 containing water on the conveying belt 61, whereby water contained in the swarf 809 becomes more liable to be evaporated. Note that the projected portions 6542 may not be formed on the lower surface of the top plate 654.

The conveying belt 61 is, for example, rotatable by a belt motor 612 fixed to the side wall 6551. A main driving roller 613 is attached to a shaft of the belt motor 612, and an endless conveying belt 61 is wound around the main driving roller 613. A driven roller 614 is attached to an inside surface of the side wall 6551 at a position spaced in the +Y direction by a predetermined distance from the belt motor 612, and the conveying belt 61 is wound around the driven roller 614 as well. With the belt motor 612 rotationally driving the main driving roller 613, the conveying belt 61 is rotated attendant on the rotation of the main driving roller 613 and the driven roller 614.

For example, a thickness adjusting mechanism 66 for extending the swarf 809 containing water which is mounted on the conveying belt 61 into a predetermined thickness on the conveying belt 61 is disposed in the drying chamber 65. The thickness adjusting mechanism 66 in the present embodiment is, for example, a pair of clamping rollers which are disposed such as to clamp from the upper and lower sides the conveying belt 61 in the vicinity of a position where the swarf 809 is charged onto the conveying belt 61 and which are rotated by a frictional force received from the conveying belt 61. Each of both ends in the X-axis direction of the pair of clamping rollers is, for example, fixed to each side wall 6551 facing each other in the X-axis direction. The pair of clamping rollers extend, for example, in the X-axis direction in a length of equal to or more than the width of the conveying belt 61. Note that the thickness adjusting mechanism 66 may be a squeegee or the like disposed on the upper side of the conveying belt 61.

On the other end side (+Y direction side) of the top plate 654, the exhaust port 651 for exhausting air to the outside of the drying chamber 65 is formed to penetrate the top plate 654.

A suction port of a blower fan 672 communicates with the exhaust port 651 through an exhaust pipe 671. One end of a piping 673 is connected to a discharge port of the blower fan 672. In the present embodiment, for example, a division section 674 that divides the flow rate of exhaust air by the blower fan 672 into two portions and that is capable of regulating flow rate is connected to the other end of the piping 673. The division section 674 is, for example, a branching three-way adjusting valve, but, by using a three-way pipe, exhaust air may be divided into predetermined flow rates by piping diameters of a plant equipment side piping 675 and an introduction pipe 676.

The plant equipment side piping 675 communicating with an exhaust device 69 of a plant equipment including a suction unit and one end of the introduction pipe 676 for returning the exhaust air of one of the flow rates divided by the division section 674 into the drying chamber 65 are connected to the division section 674. For example, a return inlet 6548 is formed at a position of the top plate 654 between the charging port 650 and the exhaust port 651, and the other end of the introduction pipe 676 is connected to the return inlet 6548.

Note that the swarf powder recovery device 6 may have a configuration in which the exhaust air exhausted from the drying chamber 65 is not returned.

On the other end side (+Y direction side) of the bottom plate 653, a powder discharge port 658 is formed to penetrate the bottom plate 653 in the thickness direction, and the conveying belt 61 drops the swarf powder 8091 after drying toward the powder discharge port 658. On the lower side of the powder discharge port 658, an open-close door 6581 supported by a spring hinge or the like and capable of being opened and closed by the weight of the swarf powder 8091 is disposed.

On the lower side of the other end (end on the +Y direction side) of the drying chamber 65, a recovery box 63 is disposed. The recovery box 63 is opened directly beneath the powder discharge port 658 of the drying chamber 65. On an upper portion side of the recovery box 63, for example, a sensor (for example, a transmission type optical sensor) (not illustrated) is disposed. When the dried swarf powder 8091 is dropped from the powder discharge port 658 into the recovery box 63 and the swarf powder 8091 is accumulated to a predetermined height in the recovery box 63, information that the recovery box 63 should be replaced is given by the sensor. Note that the recovery box 63 may include a weight sensor, or may not include such a sensor as above-mentioned.

Operations of the waste liquid treating device 1 and the swarf powder recovery device 6 in the case of removing the water-containing swarf 809 from the waste liquid 90 containing the swarf 809 of the workpiece 80 discharged by grinding of the solid workpiece 80 depicted in FIG. 1 by the grindstones 4044 while supplying a processing liquid and drying the removed swarf 809 to obtain the swarf powder 8091 will be described below.

First, the workpiece 80 is suction held by the holding surface of the holding table 41, and the table support base 42 is driven to position the workpiece 80 on the holding table 41 at a grinding position facing the grindstones 4044. Then, the grinding wheel 404 is rotated, the grinding unit 40 is lowered, and the rotating grindstones 4044 makes contact with the upper surface of the workpiece 80, whereby grinding is performed. In addition, since the holding table 41 is rotated at a predetermined speed and thereby the workpiece 80 is also rotated, grinding of the whole area of the upper surface of the workpiece 80 by the grindstones 4044 is conducted. During the grinding, a processing liquid (for example, pure water) is supplied to the contact part between the grindstones 4044 and the workpiece 80, whereby the contact part is cooled and cleaned.

The workpiece 80 is ground by the grinding, fine swarf 809 of the workpiece 80 is formed, and the swarf 809 mixes into the processing liquid, so that the waste liquid 90 containing the swarf 809 is generated. The waste liquid 90 flows through the opening 490 into the water case 48, and thereafter flows through the liquid supply pipe 4855, the tank 12 and the feed-out pipe 1211 into the water tank 2, to be reserved in the water tank 2.

In a state in which the waste liquid 90 is thus reserved in the water tank 2, the adhesion plates 31 and the cathode plates 30 are immersed in the waste liquid 90, plus (+) of the DC power source (not illustrated) is applied to the adhesion plates 31, whereas minus (−) of the DC power source is applied to the cathode plates 30. As a result, an electric field is generated between the adhesion plate 31 and the cathode plate 30. Then, the swarf 809 mixed into the waste liquid 90 and electrified in minus (−) polarity is repelled by the cathode plates 30 electrified in minus (−) polarity, and is adsorbed mainly on both sides of the adhesion plates 31 electrified in plus (+) polarity.

The clean water 92 roughly deprived of the swarf 809 due to the adsorption of the swarf 809 on the adhesion plates 31 is taken by the discharge section 331, and is sent to the clean water reserving tank (not illustrated).

After a predetermined amount of the swarf 809 is adsorbed on the adhesion plates 31, the Y-axis moving mechanism 34 depicted in FIG. 1 positions the vertically moving mechanism 32 and the holding section 35 on the upper side of a single target adhesion plate 31. Next, the holding section 35 is lowered to hold the adhesion plate 31, and the adhesion plate 31 is pulled out of the waste liquid 90 in the water tank 2. Then, the Y-axis direction moving mechanism 34 moves the holding section 35 that holds the adhesion plate 31 to the upper side of the entrance port 1622 of the casing 162 of the peeling mechanism 16.

Next, under the control of the vertically moving mechanism 32 by the control unit 166 depicted in FIG. 3, the holding section 35 holding the adhesion plate 31 is lowered by the vertically moving mechanism 32, the adhesion plate 31 enters through the entrance port 1622 into the casing 162, and, for example, the whole of the part of the adhesion plate 31 where the swarf 809 is adhered is positioned to be below the jet ports 1600 of the two air nozzles 160 in the casing 162, after which the lowering of the adhesion plate 31 is stopped. In other words, the adhesion plate 31 is positioned in the spacing between the two parallel air nozzles 160.

Thereafter, under the control of the vertically moving mechanism 32 by the control unit 166, the holding section 35 holding the adhesion plate 31 is raised at a predetermined speed by the vertically moving mechanism 32, and a current is passed to the valve 168 from the control unit 166, whereby the valve 168 is put into an open state. Then, compressed air fed out from the air source 169 is passed through the piping 167, is jetted toward an oblique lower inner side from the jet ports 1600 of the two air nozzles 160 to form an air curtain, and is blown to a side surface on one side on the −Y direction side of the adhesion plate 31 and on a side surface on the other side in the +Y direction side. Then, by the air pressure of the air, the swarf 809 adhered to both side surfaces of the adhesion plate 31 which is raised is washed away downward on a non-contact basis, and is peeled off from the adhesion plate 31 and charged through the charging port 650 into the drying chamber 65 together with the air.

When the adhesion plate 31 which is raised passes completely through the air curtain formed by the two air nozzles 160, a state in which the swarf 809 is peeled off from the whole area of both side surfaces of the adhesion plate 31 is obtained. In this way, in the waste liquid treating device 1 according to the present embodiment, the swarf 809 can be peeled off from the adhesion plate 31 on a non-contact basis by the air pressure of air, and, therefore, the adhesion plate 31 would not be damaged.

Note that the peeling-off of the swarf 809 adhered to a single adhesion plate 31 by the air pressure of air may be performed repeatedly, by control of the vertically moving mechanism 32 and the valve 168 by the control unit 166.

The adhesion plate 31 from which the swarf 809 has been peeled off is conveyed out from the casing 162 by the vertically moving mechanism 32, and, for example, is again carried to the water tank 2 by the Y-axis direction moving mechanism 34, to be returned to an original place in the water tank 2.

The swarf 809 is, for example, becomes a lump, which drops through the charging port 650 onto the guide plate 6505 inside the box together with the air, and is further moved onto the conveying belt 61.

Then, the conveying belt 61 is rotated by the belt motor 612, the main driving roller 613, and the driven roller 614, to convey the swarf 809 containing water from the −Y direction side to the +Y direction side. As depicted in FIG. 3, the thickness adjusting mechanism 66 is disposed for the conveying belt 61, and, by passing through the thickness adjusting mechanism 66, the water-containing swarf 809 on the conveying belt 61 is extended on the conveying belt 61 to a predetermined thickness (for example, 1 to 2 mm).

Conveying of the swarf 809 with a high water content by the conveying belt 61 is conducted, air jetted from the two air nozzles 160, passed through the casing 162 and reaching through the charging port 650 into the drying chamber 65 flows further through the air duct 659 in the conveying direction (from the −Y direction toward the +Y direction) of the swarf 809. As a result, water contained in the swarf 809 on the conveying belt 61 is evaporated, and the swarf 809 is dried. In addition, the blower fan 672 disposed in the exterior of the drying chamber 65 is driven, whereby air flowing in the air duct 659 in the drying chamber 65 from the −Y direction toward the +Y direction is sucked in through the exhaust port 651.

The air capacity of the blower fan 672 is set, for example, to 10 m³/min. Then, the exhaust air sucked in from the inside of the drying chamber 65 and discharged from the discharge port of the blower fan 672 into the piping 673 is divided at the division section 674 into two portions, that is, exhaust air at the other of the flow rates (for example, air capacity of 5 m³/min) flowing toward the side of the exhaust device 69 of the plant equipment and exhaust air 1608 at the one of the flow rates (for example, air capacity of 5 m³/min) returned into the drying chamber 65. Note that the exhaust air absorbs heat generated by a motor (not illustrated) of the blower fan 672, and, therefore, the temperature of the exhaust air is raised by 5 to 6 degrees in the blower fan 672. Then, the exhaust air 1608 on one side raised in temperature is returned into the drying chamber 65 through the introduction pipe 676 and the return inlet 6548 and flows toward the +Y direction, thereby to efficiently evaporate the water contained in the swarf 809. Note that the ratio between the one of the flow rates of the exhaust air 1608 and the flow rate of the exhaust air flowing toward the side of the exhaust device 69 of the plant equipment is not limited to the above-mentioned value of 1:1.

With water removed from the water-containing swarf 809 as above, only the dried swarf powder 8091 is left on the conveying belt 61. When the dried swarf powder 8091 on the conveying belt 61 is conveyed beyond the driven roller 614, the dried swarf powder 8091 drops toward the recovery box 63. By the weight of the dried swarf powder 8091, the open-close door 6581 is opened, and the swarf powder 8091 deprived of water is recovered by the recovery box 63.

As has been described above, the swarf powder recovery device 6 for recovering the swarf powder 8091 (in the present embodiment, silicon powder) obtained by drying the water-containing swarf 809 peeled off from the adhesion plates 31 by the peeling mechanism 16 of the waste liquid treating device 1 includes the drying mechanism 60 that dries the swarf 809 peeled off from the adhesion plates 31 by the peeling mechanism 16. The drying mechanism 60 includes the conveying belt 61 on which to mount the swarf 809 peeled off by the peeling mechanism 16 and which moves the swarf 809 in a horizontal direction (Y-axis direction), the recovery box 63 that recovers the swarf powder 8091 conveyed by the conveying belt 61, and the drying chamber 65 covering an upper portion of the conveying belt 61 and extending in the extending direction of the conveying belt 61. The drying chamber 65 includes the charging port 650 disposed on one end side of the conveying belt 61 for charging the swarf 809, and the exhaust port 651 disposed on the other end side of the conveying belt 61 for exhausting the air which is jetted from the air nozzles 160 of the peeling mechanism 16 and is charged into the drying chamber 65 through the charging port 650 together with the swarf 809. Therefore, it is possible, by flowing of air jetted by the air nozzles 160 in the drying chamber 65 in the direction from the charging port 650 toward the exhaust port 651, to dry the water-containing swarf 809 mounted on the conveying belt 61, and to recover the dried swarf powder 8091. In addition, when the air used in peeling off the swarf 809 from the adhesion plates 31 is charged as it is into the drying chamber 65 to be utilized as air for drying the swarf, it is thereby possible to accelerate the drying of the swarf 809, and to eliminate the need to charge separate air for drying into the drying chamber 65. Therefore, it is possible to suppress air consumption amount, and to suppress power consumption of the swarf powder recovery device 6 as compared to the case of heater drying.

It is natural that the waste liquid treating device and the swarf powder recovery device according to the present invention are not limited to those in the aforementioned embodiment, and can be carried out in various different modes within the scope of the technical thought of the invention. In addition, the shapes and the like of the components of the waste liquid treating device 1 and the swarf powder recovery device 6 depicted in the attached drawings are not limited to those depicted, and can be modified as required within such scopes that the effect of the present invention can be exhibited.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A swarf powder recovery device that recovers swarf powder obtained by drying water-containing swarf peeled off from an adhesion plate of a waste liquid treating device in which a waste liquid that contains swarf, the waste liquid being discharged when a workpiece is ground by use of a processing liquid and abrasive grains, is stored in a water tank, an adhesion plate is immersed in the waste liquid stored in the water tank, and the adhesion plate with the swarf adhered thereto is taken out of the water tank to thereby remove the swarf from the waste liquid, the waste liquid treating device including
- a holding section that holds the adhesion plate,
- a vertically moving mechanism that moves the holding section vertically, and
- a peeling mechanism that peels the water-containing swarf from the adhesion plate held by the holding section, the peeling mechanism including
- two air nozzles extending in parallel to each other in a horizontal direction with a spacing therebetween and having jet ports formed to face each other,
- a valve disposed in a piping providing communication between the two air nozzles and an air source, and
- a control unit that performs control of opening and closing of the valve and control of the vertically moving mechanism that moves the adhesion plate in a vertical direction in the spacing between the two air nozzles, and
- the valve being opened when the adhesion plate is raised after the adhesion plate held by the holding section is made to enter the spacing between the parallel two air nozzles, and the swarf adhered to the adhesion plate being peeled off on a non-contact basis by air pressure of air jetted from the jet ports to one surface and another surface of the adhesion plate, the swarf powder recovery device comprising:

a drying mechanism that dries the swarf peeled off from the adhesion plate by the peeling mechanism,
wherein the drying mechanism includes
- a conveying belt on which the swarf peeled off by the peeling mechanism is mounted and which moves the swarf in a horizontal direction,
- a recovery box that recovers the swarf powder conveyed by the conveying belt, and
- a drying chamber covering an upper portion of the conveying belt and extending in an extending direction of the conveying belt, the drying chamber includes
- a charging port which is disposed on one end side of the conveying belt and through which to charge the swarf,
- an exhaust port disposed on another end side of the conveying belt for exhausting air jetted from the air nozzles of the peeling mechanism and charged into the drying chamber together with the swarf through the charging port, and
- a return inlet disposed between the charging port and the exhaust port for returning a portion of the air exhausted through the exhaust port into the drying chamber, and
- air jetted by the air nozzles flows in the drying chamber in a direction from the charging port toward the exhaust port, to thereby dry the swarf mounted on the conveying belt and containing water, thereby recovering the swarf powder.

2. The swarf powder recovery device as defined in claim 1 further comprising:
a division section for directing the portion of the air exhausted through the exhaust port into the return inlet.

3. The swarf powder recovery device as defined in claim 2 further comprising:
a blower fan in communication with the exhaust port and the division section for supplying the air exhausted through the exhaust port to the division section.

4. The swarf powder recovery device as defined in claim 1 further comprising:
a plurality of projected portions formed in the drying chamber between the charging port and the exhaust port for creating turbulence in the air flowing through the drying chamber.

* * * * *